United States Patent [19]

Staples

[11] 3,906,926
[45] Sept. 23, 1975

[54] HEAT SOURCE FOR CURING UNDERWATER ADHESIVES

[75] Inventor: Richard M. Staples, Oxnard, Calif.

[73] Assignee: The United States of America as represented by the Secretary of the Navy, Washington, D.C.

[22] Filed: Sept. 19, 1974

[21] Appl. No.: 507,918

[52] U.S. Cl. .................... 126/263; 44/3 A; 44/3 B
[51] Int. Cl.² ............................................. F24J 1/02
[58] Field of Search ........ 126/263; 44/3 R, 3 A, 3 B

[56] References Cited
UNITED STATES PATENTS

| | | | |
|---|---|---|---|
| 1,497,970 | 6/1924 | Berkey | 126/263 |
| 1,502,744 | 7/1924 | Perrault | 126/263 |
| 1,819,807 | 8/1931 | Baysinger | 44/3 A |
| 2,541,736 | 2/1951 | Alexander | 126/263 |
| 2,615,443 | 10/1952 | Sukacev | 126/263 |
| 3,002,826 | 10/1961 | Norris | 44/3 A |

Primary Examiner—Carroll B. Dority, Jr.
Assistant Examiner—Ronald C. Capossela
Attorney, Agent, or Firm—Richard S. Sciascia; Joseph M. St.Amand

[57] ABSTRACT

A portable electrochemical source of heat particularly applicable to operate in underwater environments is provided for use in the curing of underwater adhesives and for other underwater heating requirements. Properly selected and mixed dry reactant materials are prepackaged in a waterproof container which is valved to subsequently allow water to be introduced to the dry mix and for reaction to occur with the generation of heat.

13 Claims, 4 Drawing Figures

HEAT SOURCE FOR CURING UNDERWATER ADHESIVES

This invention is related to copending U.S. Pat. application, Ser. No. 507,652 for POWDERED METAL SOURCE FOR PRODUCTION OF HEAT AND HYDROGEN GAS, and Ser. No. 507,645 now U.S. Pat. No. 3,884,216 for ELECTROCHEMICAL ENERGY SOURCE FOR DIVER SUIT HEATING, both filed together herewith on Sept. 19, 1974.

BACKGROUND OF THE INVENTION

This invention relates to means for providing heat for underwater uses, and particularly to, a portable electrochemical underwater heat source.

There are no presently available simple means for rapidly producing heat for curing of adhesives applied underwater. One must presently settle for a slow rate of reaction for curing or use an underwater torch, steam, electrically generated heat or some slow chemically generated heat for this purpose. The disadvantages of currently available means are that: the underwater torch may be hazardous when used near explosives or flammables and its heat is difficult to control; steam and electrically generated heat sources are more expensive and difficult to handle since they often require cumbersome above water equipment and more manpower; and, prior chemically generated heat sources are too slow and otherwise unsatisfactory. The heat of hydration of chemicals such as calcium chloride have been used for the heating of diver's gloves; however, because of the great expenses involved with use of divers in general, a simple, rapid, low cost method of supplying heat is desirable.

SUMMARY OF THE INVENTION

The present invention is a means for a portable and rapid source of heat primarily for use underwater. The device is simple and relatively inexpensive, and can also be used in dry environments. A mixture of dry chemical materials are packaged in a special waterproof plastic container. The container can be flexible and easily stored. No reaction can occur until water, or seawater electrolyte is introduced to the dry mix. The plastic container has means to permit introduction of the water when desired, and means to vent gases therefrom. The exothermic reaction which occurs when water is added to the dry mix generates sufficient heat to cure underwater adhesives at a much faster rate than heretofore available. The plastic container containing the reaction mixture is pressed against the underwater adhesive for application of heat thereto for curing same. The container also has means to provide thermal insulation from the surrounding exterior water or other environment.

It is an object of the invention, therefore, to provide a simple, relatively inexpensive, portable and rapid source of heat for underwater use.

It is also an object to provide a portable heat source for curing underwater adhesives.

It is another object to provide a portable, flexible, easily stored portable heat source having particular application for underwater use.

Other objects, advantages and novel features of the invention will become apparent from the following detailed description of the invention when considered in conjunction with the accompanying drawings.

DESCRIPTION OF THE PREFERRED EMBODIMENT

Figure 1:
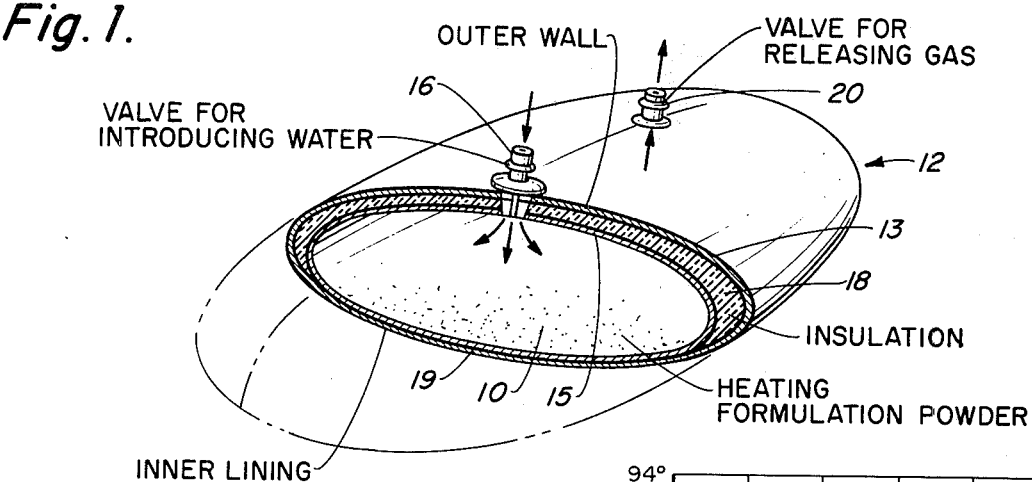
FIG. 1 shows the construction of one embodiment of the invention.

Heating powder 10 formulated from properly selected and prepared forms of magnesium metal, soluble copper salt, and an amine salt (e.g., dry powdered magnesium, anhydrous copper sulfate, and dry hydroxylamine hydrochloride) are mixed in predetermined proportions and packaged in a plastic or other waterproof container 12, such as shown in FIG. 1. While in the dry state no reaction occurs with the mixed ingredients. When water is subsequently introduced to the dry mix, via valve 16, for example, through the wall of container 10, a vigorous exothermic reaction will occur with the evolution of ammonia and hydrogen gases, and with the generation of sufficient heat, for example, to cure underwater adhesives and obtain underwater adhesive bonding strengths in 0.5 hour what previously required 24 hours to achieve.

As shown in the embodiment of FIG. 1, the heat source package consists essentially of a flexible waterproof plastic container 12, having an outer wall 13 and an inner lining 15. Some suitable types of plastic material for construction of the container would be mylar and polysulfonates, for example. Other suitable materials can also be used. A valve 16, for example, can be used for introducing water into the interior of container 12 where it mixes with dry mix 10 for generating heat. When used in an underwater environment, a container 12 containing only heating powder mixture 10 can be taken to the area where it is to be used prior to opening valve 16 to allow introduction of water or seawater. If desired, the interior of the container can be under a vacuum so water can be drawn into the container faster when valve 16 is opened. Container 12 can be provided with any suitable insulating material 18 between outer wall 13 and inner lining 15 to provide a thermal insulation between the interior of the container and the surrounding water or other exterior environment. The bottom 19 or other wall surface of container 12 through which heat is to be transferred has no insulation between the outer wall 13 and inner lining 15, such as shown in FIG. 1. The thermal insulation 18 also operates to direct the heat generated in the container toward wall 19 for conduction to the surface to be heated. A valve 20, for example, or other means is provided through the dual wall of container 12 for releasing gas generated during the reaction. A tube can be used, if desired, to conduct the gas away from the area where the heat package is being used.

Figure 2:
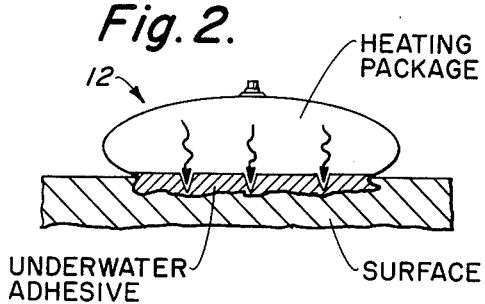
FIG. 2 illustrates an example of application of the embodiment shown in FIG. 1.

In use, the heating package, containing the reaction mixture having water introduced thereto, is pressed against the underwater adhesive which is to be cured on an underwater surface, such as shown in FIG. 2, for example. A substantial amount of the heat generated by the exothermic reaction within the package is conducted through the non-insulated wall portion 19 to the adhesive for curing the adhesive at a rapid rate. Insulation 18 in the wall of container 12 also provides a safety feature by helping to insulate the heat from the hands of the person placing or pressing the heating package against the surface to be cured or heated. By using a flexible plastic container 12 the heat package will adjust to the contour of the surface it is pressed against. The exact shape and size of the heating package can be varied to suit the application and needs where used. It is not required that the container 12 be flexible, but may be of rigid wall construction or even partially rigid and partially flexible, as desired.

Figure 3:
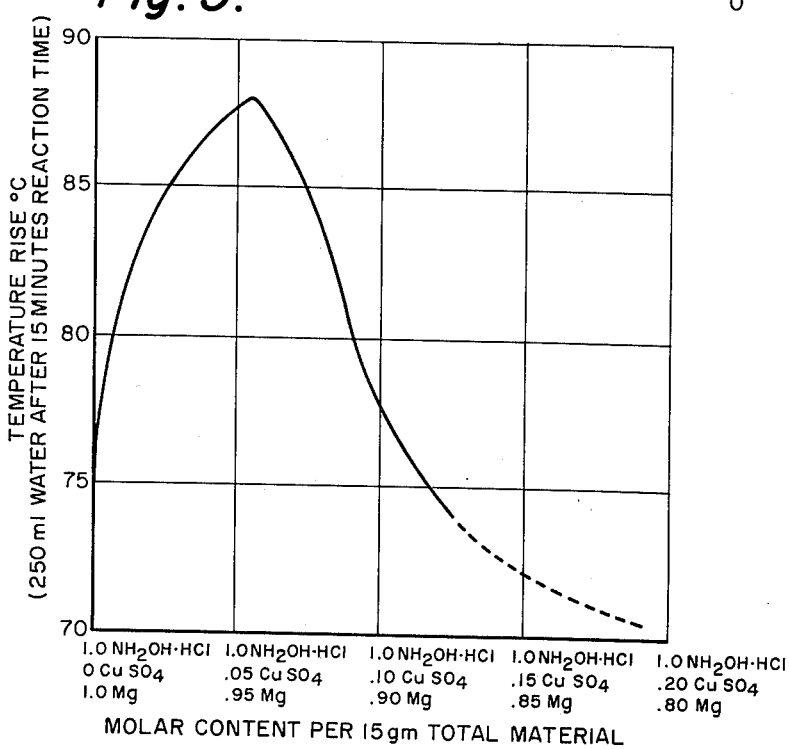
FIG. 3 shows temperature rise of water for specific chemical mix formulations.

The exact proportions of reactants in the predetermined mix depend upon the temperature desired. For example, the curve of FIG. 3 shows that the ratio of 1.0 mole of hydroxylamine hydrochloride, 0.055 moles of copper sulfate-anhydrous, and 0.945 moles of powdered magnesium with 250 ml of water added yields a maximum temperature of 88°C, heating the 250 ml of water in 15 minutes using only 15 gm of total material. This is approximately 16.3 kilogram calories or 64.5 BTU.

Figure 4:
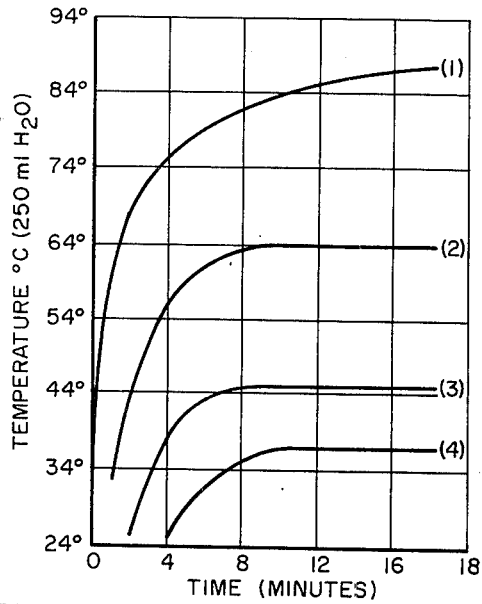
FIG. 4 shows time for temperature rise of water for various chemical mix formulations.

The curves in FIG. 4 show controlability of temperature by formula variation. Only four formula variations are shown here, but numerous variations not shown are obviously possible. Curves (1), (2), (3) and (4) were produced by formulations (1), (2), (3) and (4) in 250 ml of water, as follows:

1.
1.3 gm copper sulfate
3.4 gm magnesium
10.3 hydroxylamine hydrochloride
2.
4.7 gm copper sulfate
2.1 gm magnesium
8.2 gm hydroxylamine hydrochloride
3.
7.4 gm copper sulfate
1.1 gm magnesium
6.5 gm hydroxylamine hydrochloride
4.
9.2 gm copper sulfate
0.5 gm magnesium
5.4 gm hydroxylamine hydrochloride The temperature rise will also depend upon the amount of water added to a given amount of dry chemcial mix. Using only a small amount of water and a large amount of chemicals, a temperature rise sufficient to boil the water or even greater temperatures can be produced.

The volume size of container 12 also can be varied to hold a given amount of water for a given amount of dry mix chemicals contained therein to thus produce a desired temperature from the reaction.

The chemicals can be partially reacted and stored in a dry place for long periods of time. A suitable mixture of magnesium and copper sulfate can be partially reacted by adding sufficient water to cover the mixture for approximately 30 seconds, followed by removing the water and covering the mixture with acetone which stops the reaction. Then decant the acetone and dry the partially reacted chemicals prior to storage. When ready to use the partially reacted chemicals, hydroxylamine hydrochloride and water are added to start the reaction.

A variety of suitable plastic, metal, or ceramic containers can be used both to store and keep the mixed chamicals in a dry condition, and to permit addition of water later when use as a heater is desired. The chemicals can be mixed by hand or by any suitable means, in advance or just prior to use. Also, the heating system reaction will function equally as well with the introduction of either fresh water or seawater electrolyte to the dry mix.

This invention can be used as a heating source above water as well as underwater and can be applied to a variety of jobs which require a simple, low-cost heating source.

Tests have shown that use of the heating package as described herein greatly reduces the curing time of underwater adhesives necessary to obtain complete bonding strength. Two component underwater epoxy type adhesives have been found to cure more rapidly with the application of heat using the above disclosed type heating system, without any detriment to the bonding strength.

The portable heating device disclosed herein also can be used in remote areas where conventional heating sources cannot be used or would be impractical to use. In addition, the system can be adapted to diver suit heating, heating portions of machinery, equipment, etc. Any suitable means, such as removable adhesives, magnets, ties, etc., can be provided for holding the heating package against a surface to be heated.

Care should be taken in the handling of copper sulfate and hydroyxlamine hydrochloride chemicals which are poisonous. Normal care should be taken to avoid contact of the chemicals with skin or eyes and prevent inhalation of chemical dust. Care should also be taken to promptly dispose of any packages of dry mix reactants that have been accidentally opened as the mixture will eventually react with moisture in the air. Since some hydrogen gas is evolved during such reaction, an explosive or flamable environment could be created in poorly ventilated storage areas if the chemicals are not properly protected from moisture. However, with the proper care and caution normally afforded the handling and storage of such chemicals there should be no problems.

Other chemical mix variations, such as copper-sulfate/magnesium powder mixes or magnesium/iron powder mixes can be used where slow minimal heat increases are sufficient. Seawater rather than pure water is used with magnesium/iron powder mixes of the type such as disclosed in aforementioned Application, Ser. No. 507,652. The copper-sulfate/magnesium powder formulations without hydroxylamine hydrochloride release more hydrogen gas which must be vented away. The gases released during the reaction serve no useful purpose for curing underwater adhesives and, therefore, formulations which produce a minimum of gas may be preferred. The gases generated can be vented away through a tube or conduit to where they can be used for other purposes or disposed of as desired. Obviously, many modifications and variations of the present invention are possible in the light of the above teachings. It is therefore to be understood that within the scope of the appended claims the invention may be practiced otherwise than as specifically described.

What is claimed is:
1. A portable electrochemical underwater heat source, comprising:
 a. a waterproof container operable for use as a heating chamber;

b. at least one wall of said container operable to conduct heat therethrough for transferring heat from inside said container to a surface immediately adjacent said at least one wall operable to conduct heat therethrough, the remaining walls of said container being thermally insulated from the surrounding environment;

c. said container having an outer wall and an inner lining, and thermal insulation material is provided between said outer wall and said inner lining only in said remaining walls where insulation is desired, said at least one wall operable to conduct heat therethrough being free of said thermal insulation material;

d. a mixture of dry powdered chemicals in said container which are non-reacting in the dry state, said mixture of dry powdered chemicals upon the addition of water thereto operable to react rapidly to generate heat in an exothermic reaction;

e. means for introducing a desired amount of water into said container and retaining the water therein;

f. means for venting away any gases from said container that may be generated during said exothermic reaction;

g. the proportions of said mixture of dry powdered chemicals and said water being varied as desired to produce various temperatures from said reaction;

h. said thermally insulated container walls also being operable to direct heat generated inside said container in the direction of said at least one wall operable to conduct heat therethrough.

2. A heat source as in claim 1 wherein the walls of said container are made from flexible plastic material capable of withstanding high temperatures.

3. A heat source as in claim 1 wherein said mixture of dry powdered chemicals when reacted with water will generate usable heat sufficient to boil water and greater.

4. A heat source as in claim 1 wherein said water introduced is seawater.

5. A heat source as in claim 1 wherein said mixture of dry powdered chemicals consists of dry prepared forms of magnesium metal, soluble copper salt and an amine salt.

6. A heat source as in claim 1 wherein said mixture of dry powdered chemicals consists of dry powdered magnesium metal, anhydrous copper sulfate and dry hydroxylamine hydrochloride in predetermined proportions depending upon the amount of heat desired.

7. A heat source as in claim 1 wherein dry partially reacted chemicals are used in said mixture of dry powdered chemicals.

8. A heat source as in claim 1 wherein said container is made from mylar plastic material.

9. A heat source as in claim 1 wherein 15 grams of said mixture of dry powdered chemicals consisting of the ratio of 1.0 mole of hydroxylamine hydrochloride, 0.055 moles of copper sulfate-anhydrous, and 0.945 moles of powdered magnesium, when reacted in 250 milliliters of water will yield a temperature of 88°C in 15 minutes time with the reaction components.

10. A heat source as in claim 1 wherein said mixture of dry powdered chemicals consists of magnesium and anhydrous copper sulfate.

11. A heat source as in claim 1 having means thereon for holding said at least one wall operable to conduct heat therethrough against a surface to be heated.

12. A heat source as in claim 1 wherein said outer wall and inner lining form a dual wall container, the non-insulated portion of which operates to conduct heat generated by exothermic reaction sufficient to cure an adhesive applied underwater to a surface adjacent said non-insulated wall portion, said means for introducing water into said dual wall container being a control valve which allows the water to be drawn as desired into the interior of said container under a vacuum.

13. A heat source as in claim 1 wherein said means for venting away any gases from said container comprises a valve to release the gas generated during said exothermic reaction and a tube for conducting said gas away from the area where the heat source is being used.

* * * * *